United States Patent
Monti

(10) Patent No.: US 7,220,932 B2
(45) Date of Patent: May 22, 2007

(54) WORK UNIT FOR CONVEYING BOTTLES BETWEEN TWO STATIONS AND FOR REJECTING FAULTY BOTTLES

(75) Inventor: Giuseppe Monti, Pianoro (IT)

(73) Assignee: Marchesini Group S.p.A., Pianoro (Bologna) (IT)

( * ) Notice: Subject to any disclaimer, the term of this patent is extended or adjusted under 35 U.S.C. 154(b) by 0 days.

(21) Appl. No.: 11/361,082

(22) Filed: Feb. 23, 2006

(65) Prior Publication Data

US 2006/0245857 A1    Nov. 2, 2006

(30) Foreign Application Priority Data

Feb. 24, 2005   (IT)   ............... BO2005A0095

(51) Int. Cl.
*B65G 47/46*   (2006.01)

(52) U.S. Cl. .................. 209/524; 209/643; 198/370.1; 198/370.12; 198/438; 198/441

(58) Field of Classification Search ............ 198/370.1, 198/370.12, 471.1, 478.1, 438, 441, 803.5; 209/643, 524, 919
See application file for complete search history.

(56) References Cited

U.S. PATENT DOCUMENTS

| | | | | |
|---|---|---|---|---|
| 2,393,188 A | * | 1/1946 | Reynolds | 209/524 |
| 3,279,599 A | * | 10/1966 | Drennan | 209/531 |
| 3,351,198 A | * | 11/1967 | Wyman | 209/528 |
| 3,382,974 A | * | 5/1968 | Mayeux | 209/524 |
| 3,651,937 A | * | 3/1972 | Kronseder | 209/524 |
| 4,094,411 A | * | 6/1978 | Kronseder et al. | 209/522 |
| 4,391,372 A | * | 7/1983 | Calhoun | 209/523 |
| 4,596,107 A | * | 6/1986 | Pfleger, Sr. | 53/53 |
| 4,601,395 A | * | 7/1986 | Juvinall et al. | 209/526 |
| 4,760,909 A | * | 8/1988 | Dudley et al. | 198/370.12 |
| 4,879,025 A | * | 11/1989 | Shapcott | 209/559 |
| 4,915,237 A | * | 4/1990 | Chang et al. | 209/524 |
| 5,193,691 A | * | 3/1993 | Chong | 209/600 |
| 5,392,928 A | * | 2/1995 | Nickey et al. | 209/643 |
| 5,404,227 A | * | 4/1995 | Sumita et al. | 356/428 |
| 6,467,609 B1 | * | 10/2002 | Williams et al. | 198/471.1 |
| 6,536,598 B2 | * | 3/2003 | Furnas | 209/523 |
| 6,557,695 B2 | * | 5/2003 | Gerber et al. | 198/473.1 |
| 6,848,564 B2 | * | 2/2005 | Nickey et al. | 198/379 |

FOREIGN PATENT DOCUMENTS

FR          1485725          6/1967

* cited by examiner

*Primary Examiner*—Douglas A. Hess
(74) *Attorney, Agent, or Firm*—William J. Sapone; Coleman Sudol Sapone P.C.

(57) ABSTRACT

A work unit for conveying bottles between two stations and for rejecting bottles considered faulty, includes a selecting disc, having a vertical axis and featuring radial seats made on its edge, for holding, in cooperation with vacuum ducts, bottles. A first track, concentric with the disc, cooperates with the seats and the vacuum ducts to guide bottles, considered good, from an inlet station to an outlet station. A second track begins in an intermediate point of the first track and extends to intersect the first track, and leads to a discharge station. The second track guides, with the cooperation of removing elements, the bottles considered faulty, from the first track to the discharge station, due to deactivation of the vacuum ducts with respect to the seats situated upstream of the discharge station and containing the faulty bottles.

7 Claims, 4 Drawing Sheets

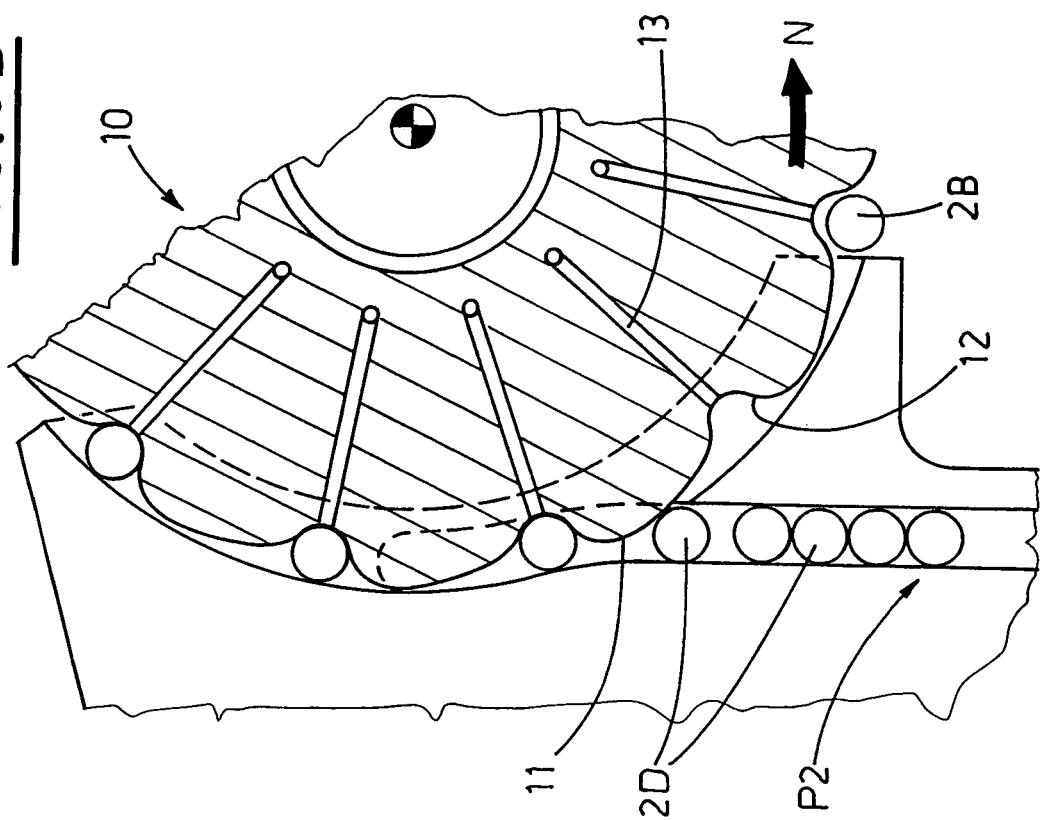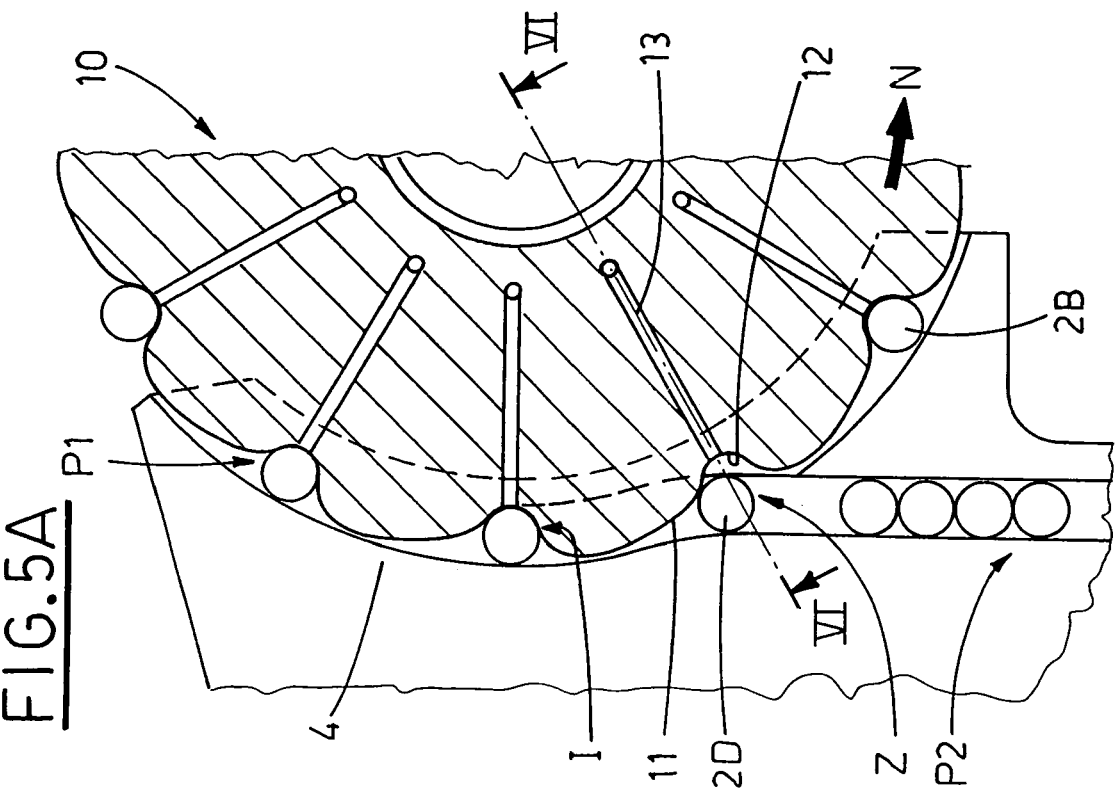

WORK UNIT FOR CONVEYING BOTTLES BETWEEN TWO STATIONS AND FOR REJECTING FAULTY BOTTLES

FIELD OF THE INVENTION

The invention relates to packaging of products into bottles and similar.

BACKGROUND OF THE INVENTION

Packaging of bottles is performed by known automatic machines, in which the bottles are fed on a conveying line, so as to be progressively taken to different work stations and then conveyed to the machines outlet.

In a rejection station, usually situated upstream of the outlet, the bottles considered faulty due to a certain reason, are separated from the remaining ones, so that only the bottles, which have selected characteristics, arrive to the outlet.

The means for defining the rejection station are obtained in relation to the intended rejection criteria, which depend on the nature of the product introduced into the bottles, on the intention or non-intention to re-cycle the product, on the material of which the bottles are made and on other factors, which can become essential on occasion.

In particular, when packaging pharmaceutical products into glass bottles, the following conditions must be ensured:
1. control of the "identity" of each bottle, so that the rejection is directed, without doubts, to the faulty bottle.
2. no faulty bottle can remain together with the good ones and be conveyed therewith to the outlet, even in case of malfunction of the means handling the bottles in the rejection station.
3. protection of the integrity of the rejected bottles, so as to allow the re-cycling of the product, which can be very expensive and/or to avoid the contamination of the environment and operators by the product.

The constructive solutions used so far to obtain work means of the rejections stations are not sufficient to ensure the above mentioned conditions.

In some cases, possible operation failures, even sporadic, cannot be accepted.

SUMMARY OF THE INVENTION

Therefore, the object of the proposed invention is to satisfy the above mentioned conditions with absolute security, by proposing an original work unit, aimed at forming the rejection station in an automatic machine for packaging bottles and similar, obtained by a technical solution, whose concept is simple, dimensions are reduced, and which can work correctly at the machine normal processing speed.

Another object of the present invention is to propose a work unit, which conveys all the bottles to the rejections station even in case of failure of the bottles handling means.

A further object of the present invention is to propose a work unit, which can be used in a sterile environment or anyway in a controlled atmosphere environment, thus with the relative moving means shaped in such a way, as not to spread polluting particles.

The above mentioned objects are achieved by a work unit for conveying bottles between two stations and for rejecting bottles considered faulty, the work unit being connected to a conveying line for feeding said bottles, and including:

a selecting disc having a vertical axis and featuring radial seats made on an edge, for holding, in cooperation with vacuum means, corresponding bottles;

a first track, concentric with said disc and cooperating with said seats and said vacuum means to guide good bottles from an inlet station to an outlet station;

a second track beginning in an intermediate point of the first track and extending to intersect said first track, the second track leading to a discharge station for guiding, in cooperation with withdrawing means, faulty bottles from the first track to the unloading station, due to deactivation of said vacuum means with respect to said the seats situated upstream of said discharge station and containing the faulty bottles.

BRIEF DESCRIPTION OF THE DRAWINGS

The characteristic features of the invention will be better explained in the following description of a preferred embodiment of the work unit, in accordance with the contents of claims and with help of the enclosed drawings, in which:

FIGS. 5A, 5B are top views, like FIG. 1, of two working moments of the work unit with a bottle considered faulty;

DISCLOSURE OF THE PREFERRED EMBODIMENTS

Figure 1:
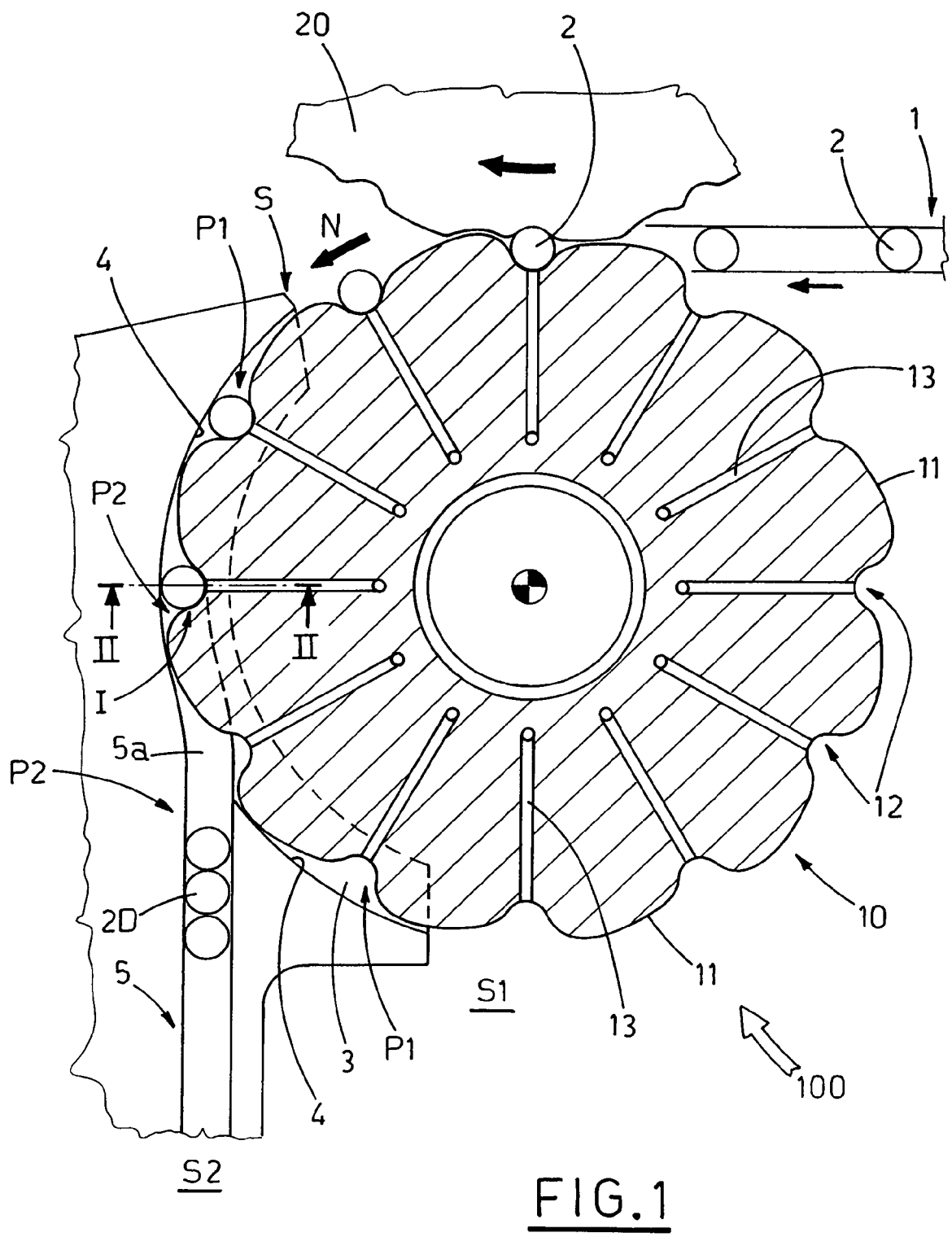
FIG. 1 is a top view of the work unit.

With reference to the above Figures, the reference numeral 100 indicates the proposed work unit, as a whole.

The work unit 100 is connected to a position downstream of a conveying line 1 for feeding bottles 2, belonging to e.g. an automatic machine for packaging the bottles 2, of known type, not shown.

The work unit 100 can be installed ahead of the outlet of the bottles 2 from the machine, at the end of the packaging section, or, if necessary, in any other intermediate point, where separation of the good bottles from the faulty ones is considered useful.

In the shown example, the bottles 2 have circular section, e.g. of the type used in the pharmaceutical field; in this case, the environment, in which the unit 100 works, can have controlled atmosphere.

The work unit 100 includes a selecting disc 10, having a vertical rotating axis, and situated tangentially to the conveying line 1, which carries the bottles 2 spaced out by a suitable step.

The selecting disc 10 includes, situated on its outer circumference, a plurality of seats 12, arranged radially and angularly spaced out, interleaved with a plurality of extracting lobes 11.

The seats 12 are connected to the conduits 13, aimed at being set under a vacuum by a source of vacuum, outer to the selecting disc 10, not shown, under control of intercepting means, likewise not shown.

The seats 12 are shaped in accordance to the bottles 2 shape, and each of them is aimed at receiving and holding one of the bottles 2, so that the contour of the bottle 2 is contained within the maximum circumferential dimension of the selecting disc 10.

The extracting lobes 11 are shaped in such a way, as to push gradually the corresponding bottles 2 outside of the selecting disc 10, during the disengaging of the bottles from the relative seats 12, as it will be better explained later.

According to a preferred embodiment, additional inlet guide means 20 cooperate with the selecting disc 10, for facilitating the picking up of the bottles 2 from the conveying line 1 and their introduction into the seats 12.

In FIG. 1, the additional means 20 include a star-wheel (seen partially), counter-rotating with respect to the selecting disc 10, shaped in such a way, as to couple complementarily with the disc profile and with the bottles 2 introduced into the corresponding seats 12.

According to a variant, not shown, the additional inlet guide means 20 can be formed by a fixed guide.

The selecting disc 10 is coupled with a first guiding track P1 for bottles 2B considered good.

The first guiding track, positioned concentric with the disc 10, extends according to a circular section, downstream of the inlet guide means 20, in a rotation direction N (in the Figures counterclockwise) of the disc 10.

The first track P1 includes a sliding base 3, situated below the seats 12 and aimed at receiving the bottles 2, and a lateral edge 4, situated peripherally with respect to the selecting disc 10, close thereto, but not enough to touch it or to hinder its rotation.

The first track P1 extends from an inlet station S to an outlet station S1 of the bottles 2B considered good, where means, not shown, collect them, when they are disengaged from the selecting disc 10.

A second guide track P2 for bottles 2D considered faulty, leads off an intermediate point I of the first guide track P1, almost tangential to the disc 10 and to the first track P1.

The second track P2 includes a groove 5, open upwards, with a bottom 5a situated at a lower level with respect to the sliding base 3 of the first track P1.

The lateral edge 4 of the first track P1 is suitably interrupted in the intersection area Z common with the second track P2.

The second track P2 extends distantly from the selecting disc 10 and leads to a discharge station S2, where the faulty bottles 2D are discharged.

Now the operation of the work unit 100 is described.

The bottles carried by the conveying line 1 toward the unit 100 have already been subjected to the tests necessary to ascertain their fitness, and they are checked, one by one, by known means, during the feeding, so that each bottle picked up from the selecting disc 10 is already identified as good or faulty.

Likewise, it is easy to identify each seat 12 of the disc 10, therefore, the managing means (not shown), which control operation of the machine and of the rejection work unit 100, have parameters that are sufficient to control different operation steps.

When a bottle is picked up from the disc 10 and introduced into the relative seat 12, the interception means allow the connection between the corresponding conduit 13 and the vacuum source, so that the bottle is held adhering to the seat 12, due to the suction effect.

Then, the bottle is brought to the initial part of the first track P1, to rest on the sliding base 3.

Figure 4:
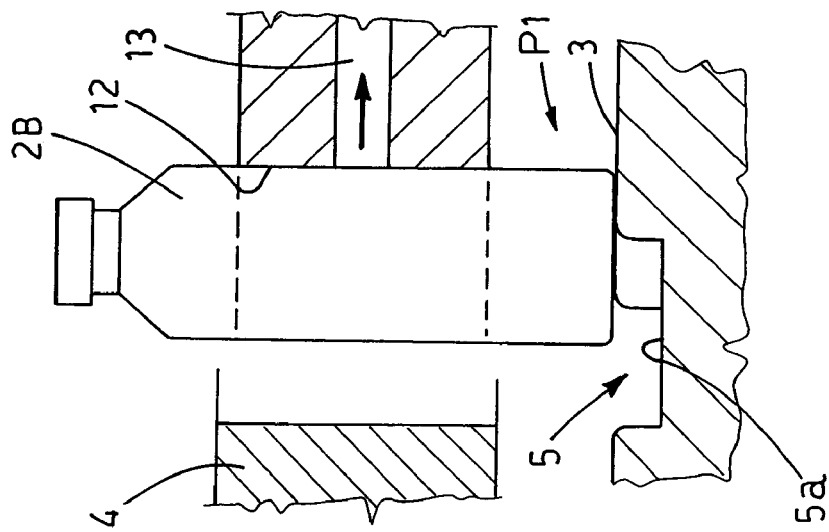
FIG. 4 is an enlarged, partially section view, taken along the plane IV—IV of FIG. 3A.
Figure 2:
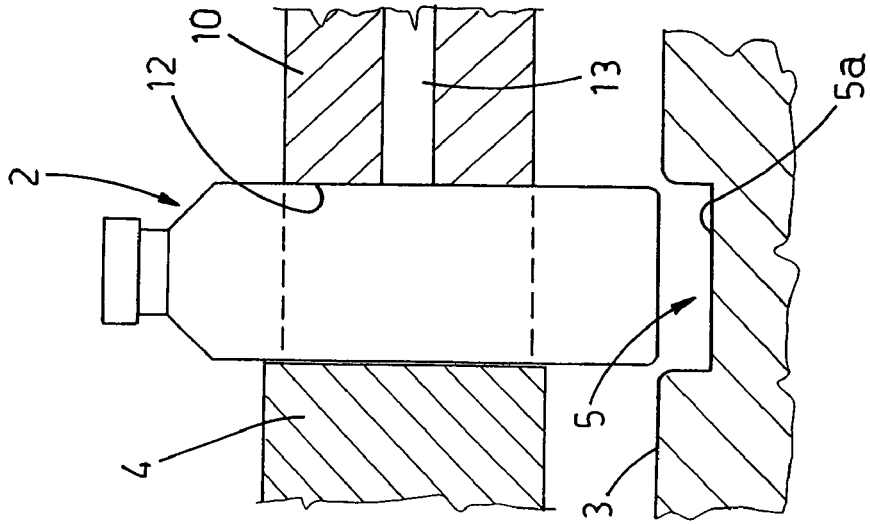
FIG. 2 is an enlarged, partial section view, taken along the plane II—II of FIG. 1.
Figure 3B:
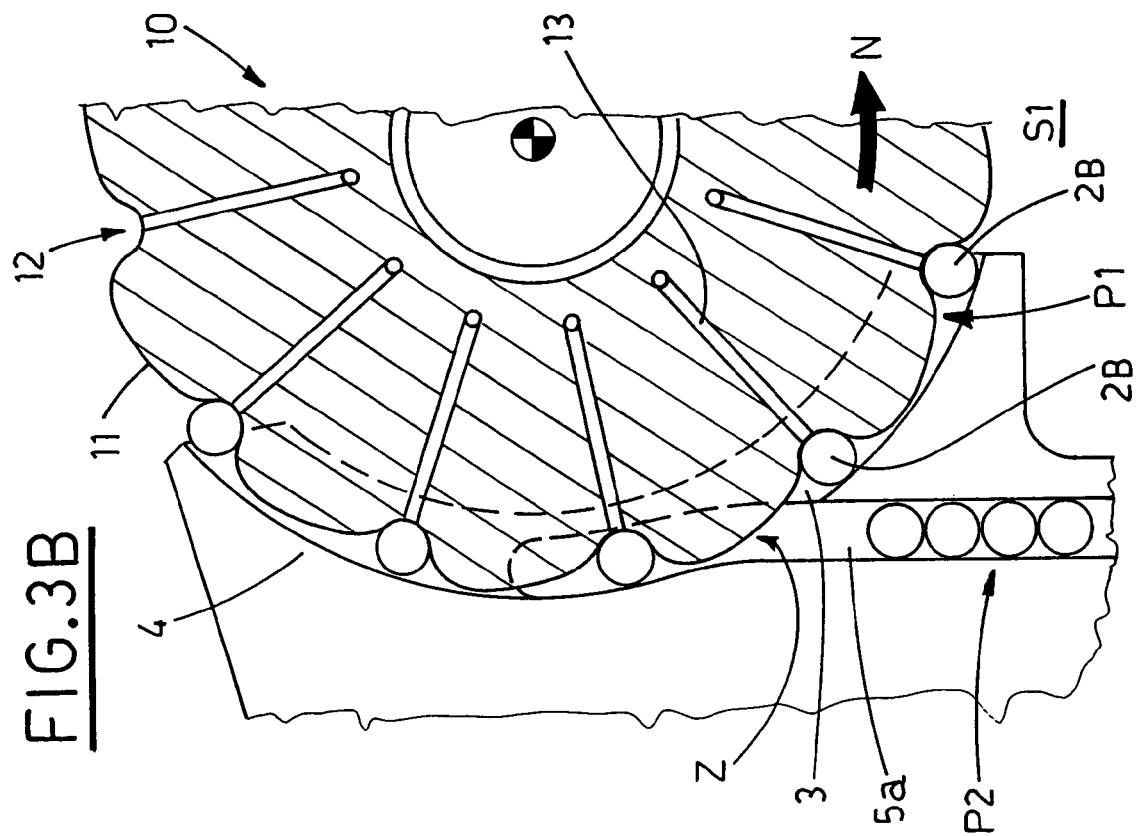
FIGS. 3A, 3B are top views, like FIG. 1, of two operation moments of the work unit with a bottle considered good.
Figure 3A:
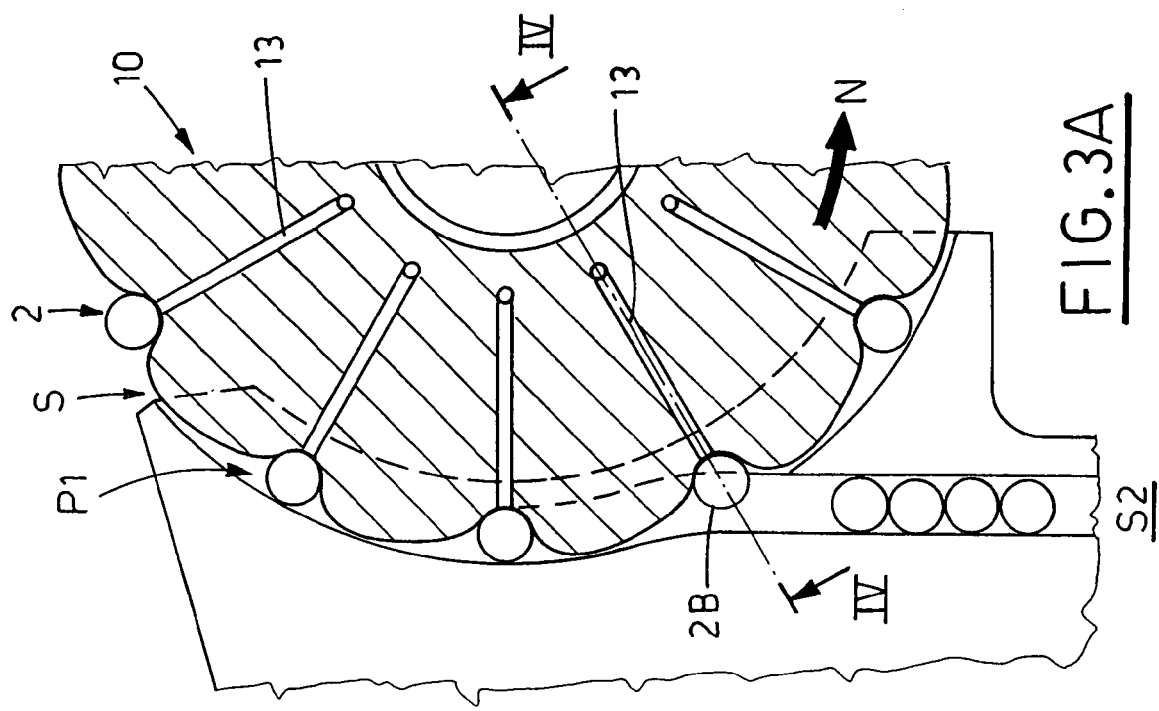

If the bottle is considered good 2B, the above mentioned suction action is maintained beyond the beginning of the second track P2, consequently, the good bottle 2B remains at the level given to it by the sliding base 3 and it can go over the intersection area Z between the first and second track P1, P2, continuing on the path of the first track P1 (FIGS. 3A and 4).

When the good bottle 2B reaches the final part of the first track P1, beyond the intersection Z (FIG. 3B), the interception means close the suction in the conduit 13 and the above mentioned good bottle 2B is so conveyed toward the outlet station S1.

The good bottle 2B disengages from the seat 12 due to the centrifugal effect, when the containing action of lateral edge 4 ceases; in this step, the extracting lobe 11, situated just behind, has only an auxiliary function to fulfill in making the outlet gradual.

Otherwise, when the disc 10 picks up a faulty bottle 2D, the suction action is interrupted before the beginning I of the second track P2.

Figure 6:
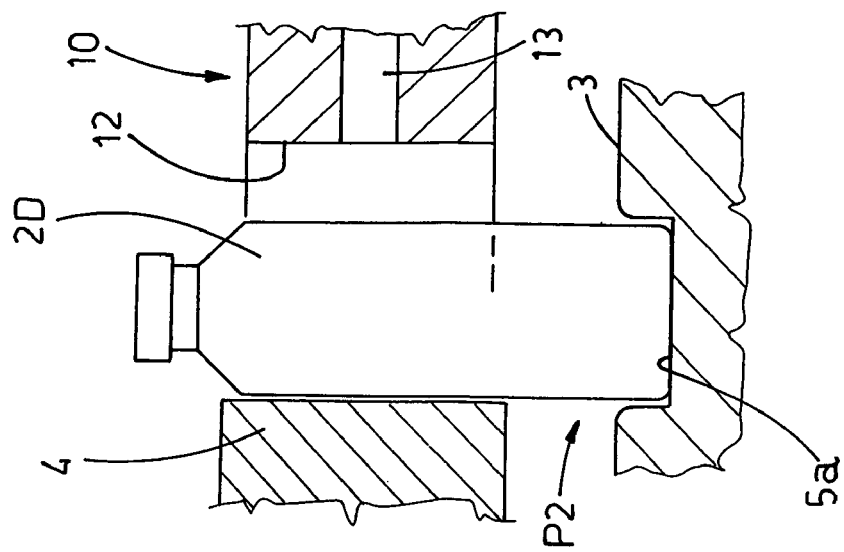
FIG. 6 is an enlarged, partially section view, taken along the plane VI—VI of FIG. 5A.

The faulty bottle 2D, no longer kept adhering to the seat 12, falls, due to the gravity, from the sliding base 3 into the groove 5 of the second track P2, remaining engaged with the groove and thus forced to follow its path, distancing from the disc 10 and from the first track P1 (FIGS. 5A and 6).

The faulty bottle 2D is disengaged from the seat 12 and pushed out of the maximum circumferential dimension of the disc 10, along the second track P2, by the action of the extracting lobe 11, which is situated just behind (FIG. 5B).

In order to make the unit 100 capable of operating also at high speeds, the interception means, between the conduits 13 and the vacuum source, are such as to act on single conduits 13, for their opening and closing, considering inevitable inertia and answer delays of these devices.

The characteristic features of the proposed work unit 100, which allows such severe conditions to be fulfilled and the indicated objects to be entirely achieved, result obvious from what above.

In fact, the bottles are kept distinctly separated from one another in any moment, so as not to confuse the good bottles with the faulty ones.

The constructive solution for separation faulty bottles from the good ones is such that any type of failure or fault can, at worst, take the good bottles to the discharge station S2, where the faulty bottles are rejected, but not vice-versa.

For example, in case of lack of suction, all the bottles are rejected.

Even if a good bottle is rejected together with the faulty ones, no considerable economic loss occurs, because the way of removing the refuses allows the bottles integrity to be protected, so as to recollect their contents.

When the bottles are integral, there is no leak of products, which could contaminate the machine working environment and/or be toxic for the staff.

With reference to the above problem, it is to be pointed out that the means of the unit 100 release almost no polluting particles into their working environment, because the only movement to transmit is the rotation of the selecting disc 10 and possibly of additional wheel 20, which, as it is known, determines one of the easiest problems, with reference only to possible leakage.

The extreme constructive simplicity of the proposed unit, and thus its convenient cost, make it unquestionably attractive also for other applications, less valuable than the described one.

However, it is understood that what above is a pure, not limiting example, therefore, possible changes of details, e.g. of the seats shape and/or extracting lobes profiles, or other, which could occur necessary for technical-functional reasons, remains within the protective scope defined by the following claims.

What is claimed is:

1. A work unit for conveying bottles between two stations and for rejecting bottles considered faulty, the work unit being connected to a conveying line for feeding said bottles, and including:
   a selecting disc having a vertical axis and featuring radial seats made on an edge, for holding, in cooperation with vacuum means, corresponding bottles;
   a first track, concentric with said disc and cooperating with said seats and said vacuum means to guide good bottles from an inlet station to an outlet station via removing means;
   a second track beginning in an intermediate point of the first track and extending to intersect said first track, the second track leading to a discharge station for guiding, in cooperation with withdrawing means, faulty bottles from the first track to an unloading station, due to deactivation of said vacuum means with respect to said seats situated upstream of said discharge station and containing the faulty bottles.

2. A work unit, as claimed in claim 1, wherein said removing means include extracting lobes formed by the edge of said selecting disc, and interleaved with the seats.

3. A work unit, as claimed in claim 1, wherein said first track includes a sliding base, situated below the bottles, and a lateral edge, situated concentric with the disc and extending along the edge of said disc, near to the disk, and in that said second track includes a groove, which is made in a portion of said sliding base, common with said first track, and whose width allows receiving the bottom of said bottles, after their disengagement from the seats.

4. A work unit, as claimed in claim 1, wherein said seats are shaped in such a way, that the contour of the bottles introduced therein is contained within the maximum circumferential dimension of the selecting disc.

5. A work unit, as claimed in claim 1, further including additional inlet guide means, cooperating with said selecting disc, to facilitate the introduction, in said inlet station, of each bottle into the corresponding seat.

6. A work unit, as claimed in claim 5, wherein said additional inlet guide means include a wheel, counter-rotating with respect to the selecting disc, shaped in such a way, as to match completely with the disc profile and with the bottles introduced into the corresponding seats.

7. A work unit, as claimed in claim 5, wherein said additional inlet guide means include a fixed guide.

* * * * *